(12) United States Patent
Krasner et al.

(10) Patent No.: US 12,328,363 B2
(45) Date of Patent: Jun. 10, 2025

(54) EFFICIENT RESOURCE SELECTION IN A HYBRID FABRIC AND NTB-BASED STORAGE SYSTEM

(71) Applicant: Dell Products L.P., Round Rock, TX (US)

(72) Inventors: Jonathan Krasner, Coventry, RI (US); Rocio Aldrich, Medfield, MA (US)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 18/328,265

(22) Filed: Jun. 2, 2023

(65) Prior Publication Data

US 2024/0406262 A1    Dec. 5, 2024

(51) Int. Cl.
*H04L 67/1097*    (2022.01)
*H04L 67/60*    (2022.01)

(52) U.S. Cl.
CPC .......... *H04L 67/1097* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 2014/0098671 A1* | 4/2014 | Raleigh | H04M 15/00 370/235 |
| 2023/0239344 A1* | 7/2023 | Bahm | H04L 67/561 709/223 |
| 2023/0409506 A1* | 12/2023 | Zheng | G06F 13/362 |

* cited by examiner

*Primary Examiner* — Natisha D Cox
(74) *Attorney, Agent, or Firm* — Daly, Crowley, Mofford & Durkee, LLP (57) ABSTRACT

A method for use in a computing device, the method comprising: detecting a request to transmit data, the data including a plurality of data portions, each of the data portions being associated with a respective remote device that the data portion is destined for; identifying a list of addresses that is associated with the request, each of the addresses in the list corresponding to the respective remote device of a different one of the plurality of data portions; detecting whether the request is local; when the request is not local, transmitting the data over a communications network; when the request is local transmitting each of the data portions in the plurality over the respective DMA link that couples the computing device with the data portion's respective remote device.

20 Claims, 8 Drawing Sheets

EFFICIENT RESOURCE SELECTION IN A HYBRID FABRIC AND NTB-BASED STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a computing device, the method comprising: detecting, by the computing device, a request to transmit data, the data including a plurality of data portions, each of the data portions being associated with a respective remote device that the data portion is destined for; identifying, by the computing device, a list of addresses that is associated with the request, each of the addresses in the list corresponding to the respective remote device of a different one of the plurality of data portions; detecting, by the computing device, whether the request is local, the detecting being performed by accessing one or more data structures to determine whether each of the recipient addresses in the list identifies a remote device that is coupled to the computing device via a respective direct memory access (DMA) link; when the request is not local, transmitting the data over a communications network; when the request is local detecting whether a predetermined condition is satisfied by the data; when the predetermined condition is satisfied, transmitting each of the data portions in the plurality over the respective DMA link that couples the computing device with the data portion's respective remote device; and when the predetermined condition is not satisfied, transmitting each of the plurality of data portions over the communications network.

According to aspects of the disclosure, a method is provided for use in a computing device, the method comprising: detecting a request to transmit a data item from the computing device to a remote device; identifying an address of the remote device; detecting, by the computing device, whether the remote device is connected to the computing device via a non-transparent bridging (NTB) link; when the remote device is not connected to the computing device via an NTB link, transmitting the data item from the computing device to the remote device via a communications network; when the remote device is connected to the computing device via an NTB link, detecting whether the data item satisfies a predetermined condition; when the predetermined condition is satisfied, transmitting the data item from the computing device to the remote device via the NTB link; and when the predetermined condition is not satisfied, transmitting the data item from the computing device to the remote device via the communications network.

According to aspects of the disclosure, a system is provided, comprising: a memory; and at least one processor that is operatively coupled to the memory, the at least one processor being configured to perform the operations of: detecting an I/O request to transmit a data item to a remote device; identifying an address of the remote device; detecting, based on the address, whether the remote device is connected to the system via a non-transparent bridging (NTB) link; when the remote device is not connected to the system via an NTB link, transmitting the data item to the remote device via a communications network; when the remote device is connected to the system via an NTB link, detecting whether the data item satisfies a predetermined condition; when the predetermined condition is satisfied, transmitting the data item to the remote device via the NTB link; and when the predetermined condition is not satisfied, transmitting the data item to the remote device via the communications network.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
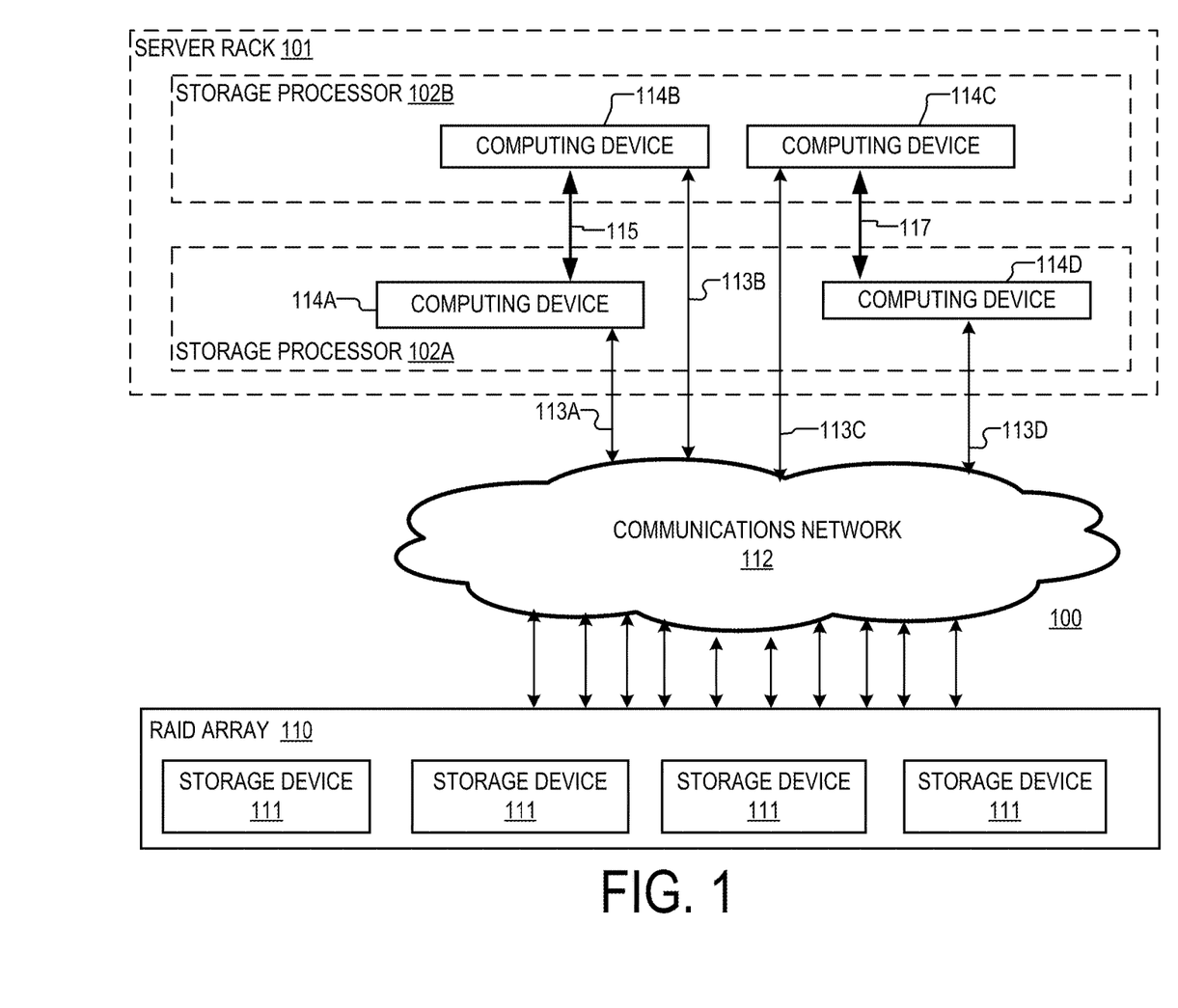
FIG. 1 is a diagram of an example of a system, according to aspects of the disclosure.

FIG. 1 is a diagram of an example of a system 100, according to aspects of the disclosure. As illustrated the system 100 may include a server rack 101, a communications network 112, and a Redundant Array of Independent Disks (RAID) array 110. The RAID array 110 may include a plurality of storage devices 111. The storage devices 111 may include Non-volatile Memory Express (NvME) devices, hard disks, solid-state drives (SSDs) and/or any other suitable type of storage device. According to the present example, the communications network 112 includes an InfiniBand network. However, alternative implementations are possible in which the communications network includes one or more of a TCP/IP network, a local area network (LAN) the Internet, a mobile data network (e.g., a 5G network) and/or any other suitable type of network.

The server rack 101 may include storage processors 102A and 102B. Storage processor 102A may include a computing device 114A and a computing device 114D. Computing devices 114A and 114D may be implemented by using different processors that are mounted on the same motherboard, and they may be arranged to access each other's random-access memory by using Direct Memory Access (DMA). Storage processor 102B may include a computing device 114B and a computing device 114C. Computing devices 114B and 114C may be implemented by using different processors that are mounted on the same motherboard, and they may be arranged to access each other's random-access memory by using Direct Memory Access (DMA).

Computing devices 114A may be coupled to the communications network 112 via a communications link 113A. Computing devices 114B may be coupled to the communications network 112 via a communications link 113B. Computing devices 114C may be coupled to the communications network 112 via a communications link 113C. Computing devices 114D may be coupled to the communications network 112 via a communications link 113D.

Computing device 114A may be coupled to computing device 114B via a Non-Transparent Bridge (NTB) link 115. Computing device 114A may use the NTB link 115 to place and receive Direct Memory Access (DMA) calls from computing device 114B. Computing device 114C may be coupled to computing device 114D via an NTB link 117. Computing device 114C may use the NTB link 117 to place and receive DMA calls from computing device 114D. NTB links 115 and 117 may be provided by the backplane of server rack 101 (not shown). In a server rack, the backplane typically includes a circuit board or set of interconnected circuit boards. It is usually located at the rear of the rack, hence the name "backplane." The backplane serves as a centralized hub for connecting servers, power supplies, storage devices, network switches, and other components.

Figure 2:
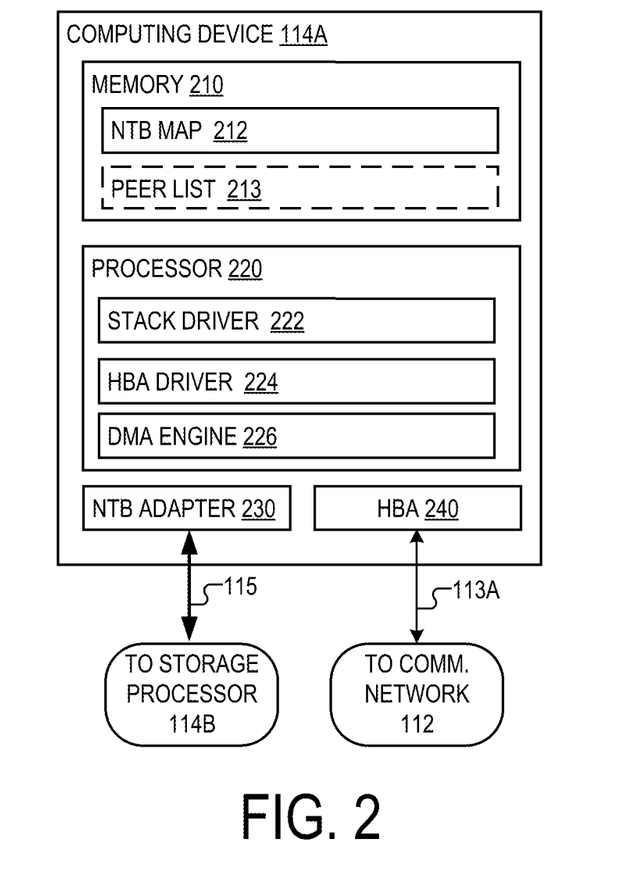
FIG. 2 is a flowchart of an example of a computing device, according to aspects of the disclosure.

FIG. 2 is a diagram of the computing device 114A, according to aspects of the disclosure. As illustrated, the computing device 114A may include a memory 210, a processor 220, an NTB adapter 230, and a Host Bus Adapter (HBA) 240. The memory 210 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 220 may include any suitable type of processing circuitry, such as one or more of a general-purpose process (e.g., an x86 processor, a MIPS processor, an ARM processor, etc.), a special-purpose processor, an application-specific integrated circuit (ASIC), a field programmable gate array (FPGA), etc. The NTB adapter 230 may be a circuit board or integrated circuit adapter that is used by the computing device 114A to implement the NTB link. The HBA 240 may be a circuit board or integrated circuit adapter that is used by the computing device 114A to implement the communications link 113A and connect the storage processor to the communications network 112. Although in the example of FIGS. 1-2 the computing device 114A is connected to only one other computing device via an NTB link, alternative implementations are possible in which the computing device 114A is connected to multiple computing devices via one or more NTB links.

The memory 210 may be configured to store an NTB map 212. The NTB map 212 may include a table or another type of data structure. The NTB map may include one or more NTB addresses. Each of the NTB addresses may belong to a different computing device that is connected to the computing device 114A via an NTB link. Each of the NTB addresses may be mapped, by the NTB map 212, to a respective network address that belongs to the same computing device as the NTB address. In other words, in some implementations, the NTB map 212 may include a plurality of entries, wherein each entry maps a respective NTB address to a corresponding network address, wherein the NTB address and the network address in any given one of the entries correspond to the same computing device. Although in the example of FIG. 2, the NTB map 212 is stored in the memory of computing device 114A, alternative implementations are possible in which the NTB map is stored remotely.

According to one example, the NTB map 212 may include only the network addresses of computing devices that are housed in the same server rack as the computing device 114A. In such implementations, the NTB map 212 may not include identifiers for any devices that are situated outside of the server rack housing the computing device 114A.

In some implementations, the NTB map 212 may be replaced with a peer list 213. The peer list 213 may include respective network identifiers for a plurality of computing devices that are both situated in the same server rack as the computing device 114A and coupled to the computing device 114A. The peer list 213 may differ from the NTB map 212 in that the peer list 213 does not include NTB addresses of the devices that are coupled to the computing device 114A via NTB links. When the peer list 213 is used instead of the NTB map 212, the computing device 114A may use alternative means for identifying the NTB addresses of any of the computing devices that are identified in the peer list 213. Such alternative means may include polling the computing devices and/or accessing another data structure that includes the addresses.

Figure 3:
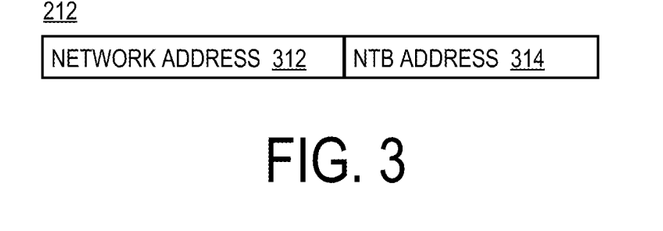
FIG. 3 is a diagram of an example of an NTB map, according to aspects of the disclosure.

FIG. 3 shows an example of the NTB map 212, according to aspects of the disclosure. In the example of FIG. 3, the NTB map 212 includes one entry that maps a network address 312 of the computing device 114B to an NTB address 314 of the computing device 114B. The network address 312 may include any suitable identifier that is usable to address the computing device 114B over the communications network 112. The NTB address 314 may INCLUDE any suitable type of identifier that is usable to address the computing device 114B over the backplane of the server rack 101. The NTB address 314 may be part of an address space that is unique to the server rack 101, and which does not include addresses of devices located in other server racks (which may be part of the same data center as server rack 101). By contrast, the network address 312 may be part of an address space that includes the network addresses of devices that are part of server rack 101 as well as devices that are part of other server racks. According to the present example, the network address 312 is an InfiniBand address, but the present disclosure is not limited thereto. According to the present example, the NTB address is a DMA address of the computing device 114B, but the present disclosure is not limited thereto.

Returning to FIG. 2, the processor may include an HBA driver 224, a stack driver 222, and a Direct Memory Access (DMA) engine 226. The HBA driver may include a software layer that is configured to facilitate communication between the operating system of computing device 114A and the HBA 240. The stack driver 222 may include any software layer that is interposed between the HBA driver 224 and the operating system of computing device 114A. In one example, the stack driver 222 may include a multipath driver and/or another similar driver. The DMA engine 226 may include a software layer that is configured to significantly move data over the NTB adapter. In some implementations, the DMA engine 226 may be configured to execute DMA write requests to the computing device 114B.

In some implementations, the stack driver 222 may be configured to implement any of processes 500-700, which are discussed further below with respect to FIGS. 5-7. Additionally or alternatively, in some implementations, the HBA driver 224 may be configured to implement any of processes 500-700. Additionally or alternatively, in some implementations, at least some of the processes 500-700 may be performed by a software layer that is interposed between the stack driver 222 and the HBA driver 224. Additionally or alternatively, in some implementations, the stack driver 222 and the HBA driver 224 may be configured to perform the processes 500-700 together.

Figure 4:
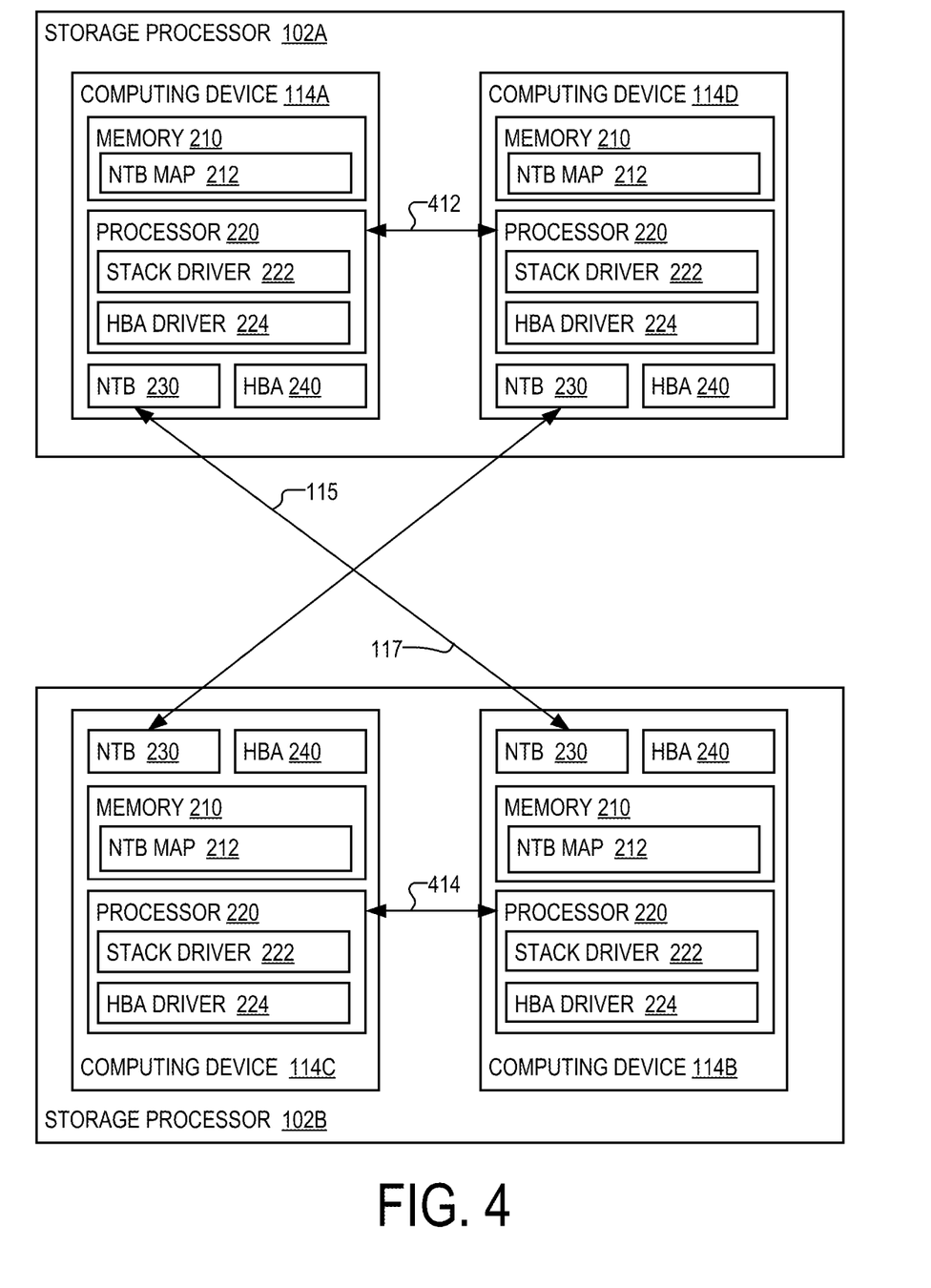
FIG. 4 is a diagram of an example of a system, according to aspects of the disclosure.

FIG. 4 shows that the system 100 in further detail, according to aspects of the disclosure. In one aspect, FIG. 4 illustrates that each of computing devices 114B, 114C, and 114D may have the same or similar configuration as computing device 114A. In another aspect, FIG. 4 illustrates that computing devices 114A and 114D may be coupled by a bus 412, which enables computing devices 114A and 114D to access each other's memory. Bus 412 may be provided in the motherboard that is shared between computing devices 114A and 114D. In yet another aspect, FIG. 4 illustrates that computing devices 114B and 114C may be coupled to each other via a bus 414, which enables computing devices 114B and 114C to access each other's memory. Bus 414 may be provided in the motherboard that is shared between computing devices 114B and 114C.

Figure 5:
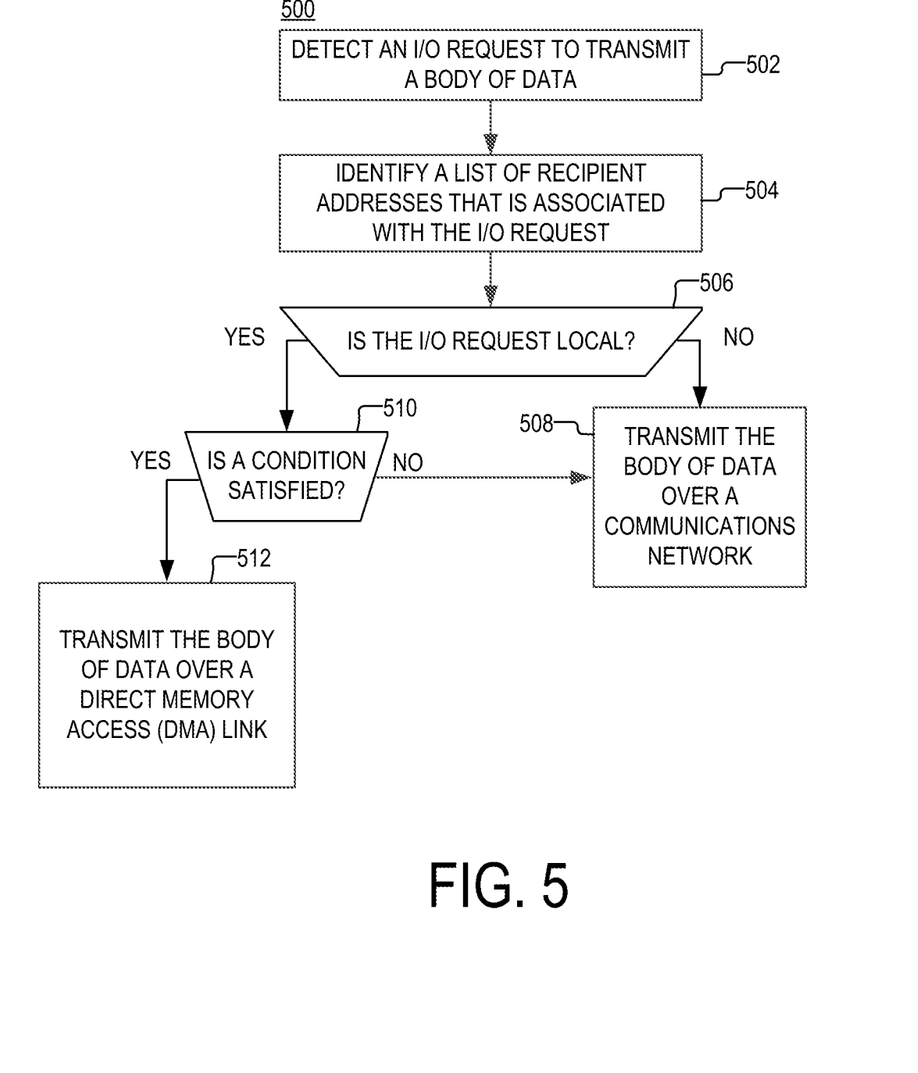
FIG. 5 is a flowchart of an example of a process, according to aspects of the disclosure.

FIG. 5 is a flowchart of an example of a process 500, according to aspects of the disclosure. According to the example of FIG. 5, the process 500 is performed by the computing device 114A. However, the present disclosure is not limited to any specific entity performing the process 500.

At step 502, the computing device 114A detects a request (or instruction) to transmit a body of data. In some implementations, the request may include a scatter-gather list (SGL). The SGL list may identify a plurality of memory regions, which may or may not be contiguous. In addition, for each of the memory regions, the SGL may provide a respective network address (e.g., an InfiniBand address) that belongs to a computing device that is required to receive the data that is stored in the regions. In other words, in some implementations, the SGL may include a list of addresses wherein each of the addresses in the list corresponds to a different one of the memory regions identified by the SGL list, and identifies the recipient to the data that is stored in the memory regions. Although in the example of FIG. 5 the list of addresses is provided in the SGL, alternative implementations are possible in which the list of addresses is provided separately of the SGL. Stated succinctly, the present disclosure is not limited to any specific method for identifying the list of addresses.

In some implementations, each of the regions identified by the SGL may include one or more data items (e.g., data blocks, pages, etc.). According to the present example, the collection of all data items that are identified by the SGL (i.e., all data items that are part of the regions identified by the SGL) may be referred to as a "body of data" that is associated with the SGL. The combined size of all data items that are identified by the SGL may be referred to as "the size" of the body of data that is associated with the SGL.

At step 504, the computing device retrieves the list of memory addresses. The list may be retrieved from the request or from another memory location.

At step 506, the computing device determines if the request is local. In some implementations, the request is local if and only if each of the network addresses in the list belongs to computing device that is also coupled to the computing device 114A via an HBA link. In some implementations, the computing device 114A may determine whether the request is local by performing a search of the NTB map 212 to determine if each of the network addresses in the list is mapped to a corresponding NTB address. If each of the network addresses in the list is mapped, by the NTB map 212, to a corresponding NTB address, the computing device 114A may determine that the request is local. Otherwise, if at least one of the network addresses in the list is not mapped to a corresponding NTB address by the NTB map 212, the computing device 114A may determine that the address is not local.

Additionally or alternatively, in some implementations, the request may be considered local if and only if all of the recipients whose addresses are part of the list are situated in the same server rack as computing devices. Additionally or alternatively, in some implementations, the computing device 114A may determine if all of the recipients are situated in the server rack by using the peer list 213. For instance, if all of the network addresses found in the list (retrieved at step 504) are present in the peer list 213, the computing device 114A may determine that the request is local. Otherwise, if at least one of the network addresses in the list (retrieved at step 504) is not present in the peer list 213, the computing device may determine that the request is not local. It will be recalled that, in some implementations, the peer list 213 may be limited to including only the addresses of computing devices that are situated in the same server rack as the computing device 114A.

According to the example of FIGS. 1-5, the computing device 114A is coupled to only one computing device via an NTB link-namely, the computing device 114B. In this regard, the computing device 114A may determine that the request is local if the list includes only instances of the network address 312 (which belongs to computing device 114B). In other words, if all data items identified in the SGL are being addressed to the computing device 114B, the request may be considered local. On the other hand, if at least one of the data items identified in the list is addressed to another device, the request may be considered not local. If the request is found to be local, the process 500 proceeds to step 510. Otherwise, if the request is found to not be local, the process 500 proceeds to step 508.

At step 508, the computing device transmits each of the data items identified by the SGL over the communications network. In some implementations, each of the data items may be transmitted to the recipient network address for that data item that is identified in the list (retrieved at step 504).

At step 510, the computing device 114A detects if a predetermined condition is satisfied. In some implementations, step 510 may be performed in accordance with one or more of processes 600A-E, which are discussed further below with respect to FIGS. 6A-E. If the predetermined condition is satisfied, the process 500 proceeds to step 512. Otherwise, if the predetermined condition is not satisfied, the process 500 proceeds to step 508.

At step 512, the computing device 114A transmits each of the data items identified by the SGL over NTB link(s) that connect the computing device 114A with the data items' recipients. According to the present example, the computing device 114A is connected via an NTB link only to the computing device 114B. In this regard, when process 500 branches to step 512, this means that the computing device 114B is the recipient of all data items that are identified by the SGL (retrieved at step 504). Accordingly, at step 512, the computing device 114A may transmit the data items identified by the SGL (retrieved at step 504) by executing a DMA write request to the computing device 114B. In some implementations, the computing device 114A may submit the DMA write request to the DMA engine 226, and the DMA engine 226 may write the data (using DMA) to the computing device 114B by using the NTB adapter 230 and the NTB link 115.

In instances in which the data items in the SGL are directed to two or more different computing devices, the data items may generate a different respective SGL for each of the recipients that identifies only the data items that are directed to that recipient. After the SGLs are generated, the computing device 114A may execute a DMA write request to each of the recipients based on the SGL that is associated with that recipient. The DMA write request may be executed in the manner discussed above, by using the DMA engine 226 and/or the NTB adapter 230.

In some respects, step 512 results in the offloading of the I/O requests, which are intended to be executed by using the HBA 240 and the communications network 112 (i.e., Infini-Band fabric) to a DMA engine that uses NTB. As can be readily appreciated, doing so is advantageous because it can improve the operation of the computing device 114A and/or the system 100. Specifically, the offloading to the DMA engine may improve the throughput and/or latency at which data is transferred from the computing device 114A to other devices in the system 100. In some implementations, the I/O requests include Remote Direct Memory Access (RDMA) requests. However, the present disclosure is not limited to any specific type of I/O request being used.

Figure 6A:
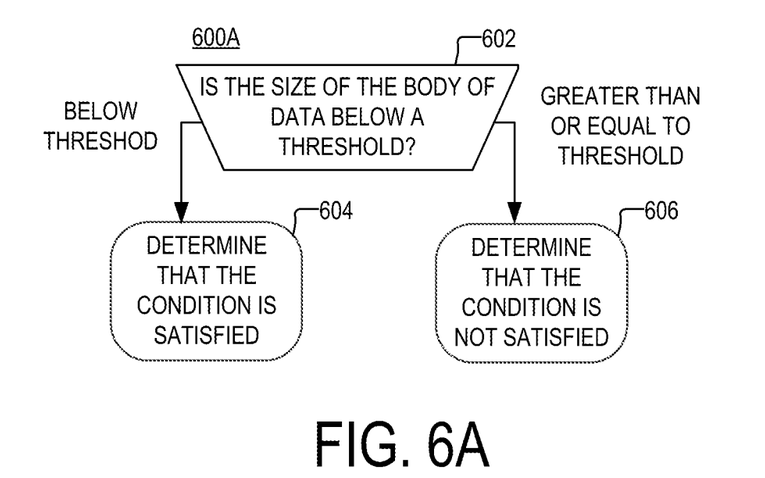
FIG. 6A is a flowchart of an example of a process, according to aspects of the disclosure.

FIG. 6A is a flowchart of an example of a process 600A for detecting whether a predetermined condition is satisfied, as specified by step 510 of the process 500 (shown in FIG. 5). At step 602, the computing device 114A detects whether the size of the body of data associated with the SGL (received at step 502) is below a predetermined threshold (e.g., 100 MB). If the size is below the threshold, the process 600A proceeds to step 604 where the computing device 114A determines that the condition is satisfied. If the size is greater than or equal to the threshold, the process 600A proceeds to step 606 where the computing device 114A determines that the condition is not satisfied. In one aspect, the condition discussed with respect to FIG. 6A ensures that data will be transferred efficiently to its destination. HBA is not as efficient for transferring large amounts of data as InfiniBand, so, in some instances, it may be desirable to limit its use to transferring amounts of data that fall below a given threshold, which is what the condition of FIG. 6A achieves. In some implementations, the given threshold may be determined by using the mean transfer times of the system.

Figure 6B:
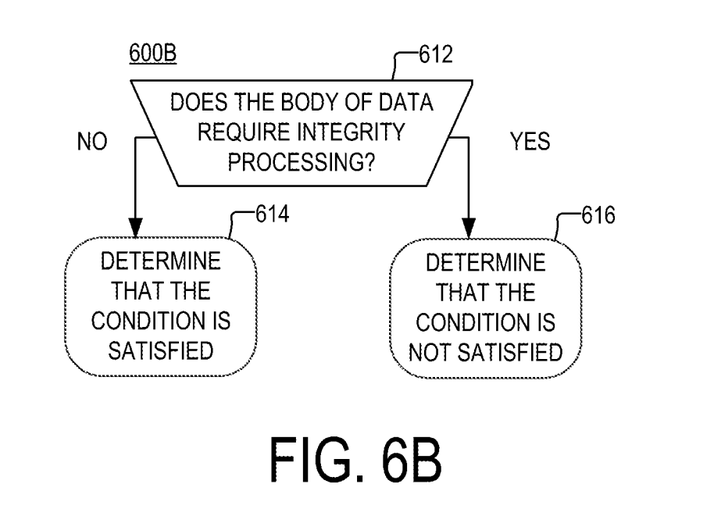
FIG. 6B is a flowchart of an example of a process, according to aspects of the disclosure.

FIG. 6B is a flowchart of an example of a process 600B for detecting whether a predetermined condition is satisfied, as specified by step 510 of the process 500 (shown in FIG. 5). At step 612, the computing device 114A detects whether the body of data (identified by the SGL) requires integrity processing. According to the present example, the body of data is considered to require integrity processing if at least one of the data items identified by the SGL requires integrity processing. According to the present example, the body of data is considered to not require integrity processing if none of the data items identified by the SGL requires integrity processing. The term "integrity processing" may refer to any operation that involves detecting whether one or more of the data items have been corrupted and/or whether data is missing. In some implementations, a data item may be deemed to require integrity processing if the data item is associated with one or more of a Cyclical Redundancy Check (CRC) value, a T10-DIF field, a T10-DIX field, and or any other suitable type of protection information. If the body of data does not require integrity processing, process 600B proceeds to step 614 where the computing device 114A determines that the condition is satisfied. If the body of data requires integrity processing, the process 600B proceeds to step 616 where the computing device 114A determines that the condition is not satisfied.

Figure 6C:
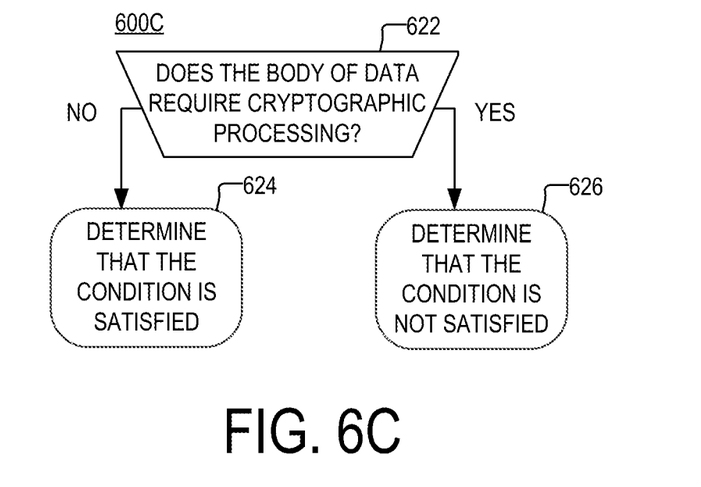
FIG. 6C is a flowchart of an example of a process, according to aspects of the disclosure.

FIG. 6C is a flowchart of an example of a process 600C for detecting whether a predetermined condition is satisfied, as specified by step 510 of the process 500 (shown in FIG. 5). At step 622, the computing device 114A detects whether the body of data that is associated with the SGL (received at step 502) requires cryptographic processing. According to the present example, the body of data is considered to require cryptographic processing if one or more of the data items identified by the SGL are encrypted (or will be encrypted upon transmission) and need to be decrypted by the recipient. If the body of data does not require cryptographic processing, process 600C proceeds to step 624 where the computing device 114A determines that the condition is satisfied. If the body of data requires cryptographic processing, the process 600C proceeds to step 626 where the computing device 114A determines that the condition is not satisfied. In one aspect, the condition of FIG. 6C ensures that data requiring cryptographic processing would be routed to the HBA adapter of the receiving device to ensure consistent processing and prevent data corruption.

Figure 6D:
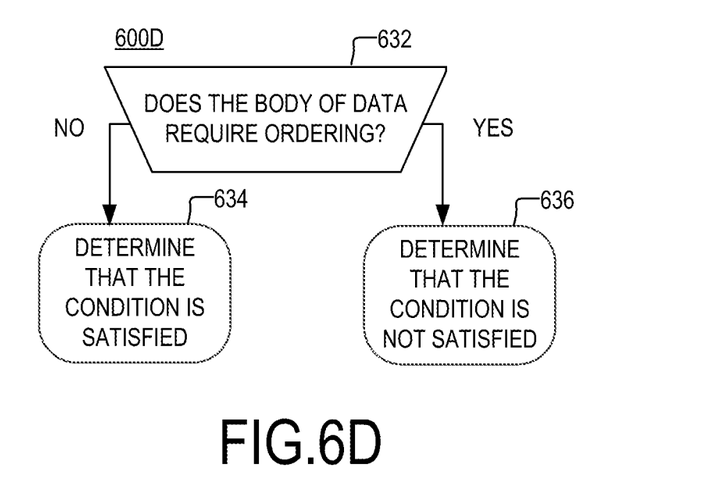
FIG. 6D is a flowchart of an example of a process, according to aspects of the disclosure.

FIG. 6D is a flowchart of an example of a process 600D for detecting whether a predetermined condition is satisfied, as specified by step 510 of the process 500 (shown in FIG. 5). At step 622, the computing device 114A detects whether the body of data (identified by the SGL) requires ordering. According to the present example, the body of data is considered to require ordering if the data items that make up the body of data are required to be received in a particular order at the recipient. The data items could be required to be received in a particular order for various reasons, such as the data items being part of a media stream or because the recipient has to process the data items as they arrive. If the body of data is not ordered, process 600C proceeds to step 634 where the computing device 114A determines that the condition is satisfied. If the body of data is ordered, the process 600D proceeds to step 636 where the computing device 114A determines that the condition is not satisfied. In general, ordered data is likely to require encoding/decoding on the receiver side. In this regard, the condition of FIG. 6D ensures that data requiring encoding/decoding would be routed to the HBA adapter of the receiving device to ensure consistent encoding or decoding.

Figure 6E:
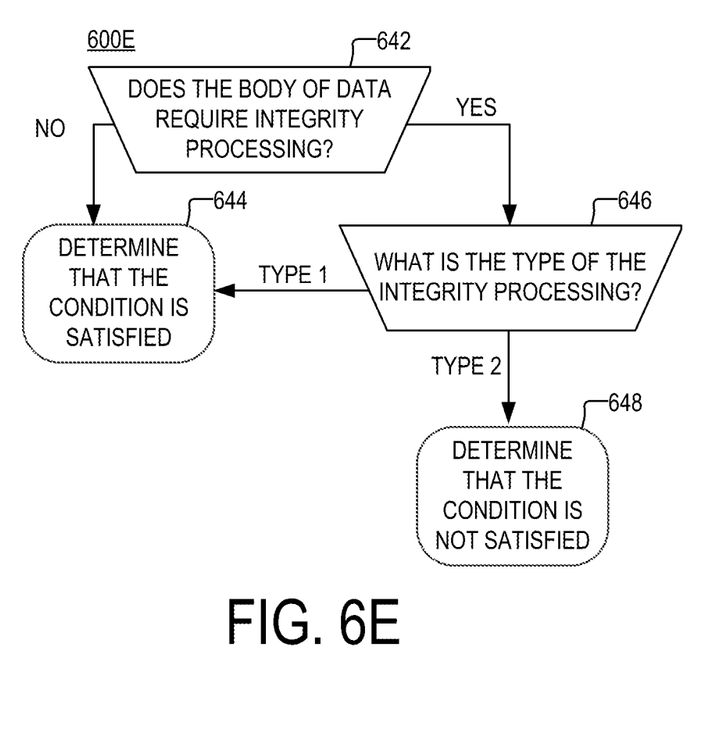
FIG. 6E is a flowchart of an example of a process, according to aspects of the disclosure.

FIG. 6E is a flowchart of an example of a process 600B for detecting whether a predetermined condition is satisfied, as specified by step 510 of the process 500 (shown in FIG. 5). At step 642, the computing device 114A detects whether the body of data (identified by the SGL) requires integrity processing. If the body of data does not require integrity processing, process 600B proceeds to step 644 where the computing device 114A determines that the condition is satisfied. If the body of data requires integrity processing, the process 600E proceeds to step 624. At step 644, the computing device 114A determines the type of integrity processing that is required. According to the present example, integrity processing that uses Block CRC or T10DIF is referred to as a type-1 integrity processing, and integrity processing that uses partial DIF (Data Integrity Field) is referred to type-2 integrity processing. If the body of data requires type-1 integrity processing, the process 600E proceeds to step 644, where the computing device 114A determines that the condition is satisfied. If the body of data requires type-2 integrity processing, the process 600E proceeds to step 648, where the computing device 114A determines that the condition is not satisfied. In one aspect, the difference between type-1 integrity processing and type-2 integrity processing is that type-2 integrity processing may be performed more efficiently by the HBA of the receiving device rather than the processor of the receiving device. In this regard, the condition of process 600E ensures that data that requires type-2 integrity processing would be routed to the HBA of the receiving device. Whether a specific type of integrity processing is designated as type-1 or type-2 may depend on the application in which the process 600E is deployed, and the process 600E is not limited to any specific designation for as long as one or more integrity processing operations/fields are designated as type-1 and one or more integrity processing operations/fields are designated as type-2.

Figure 7:
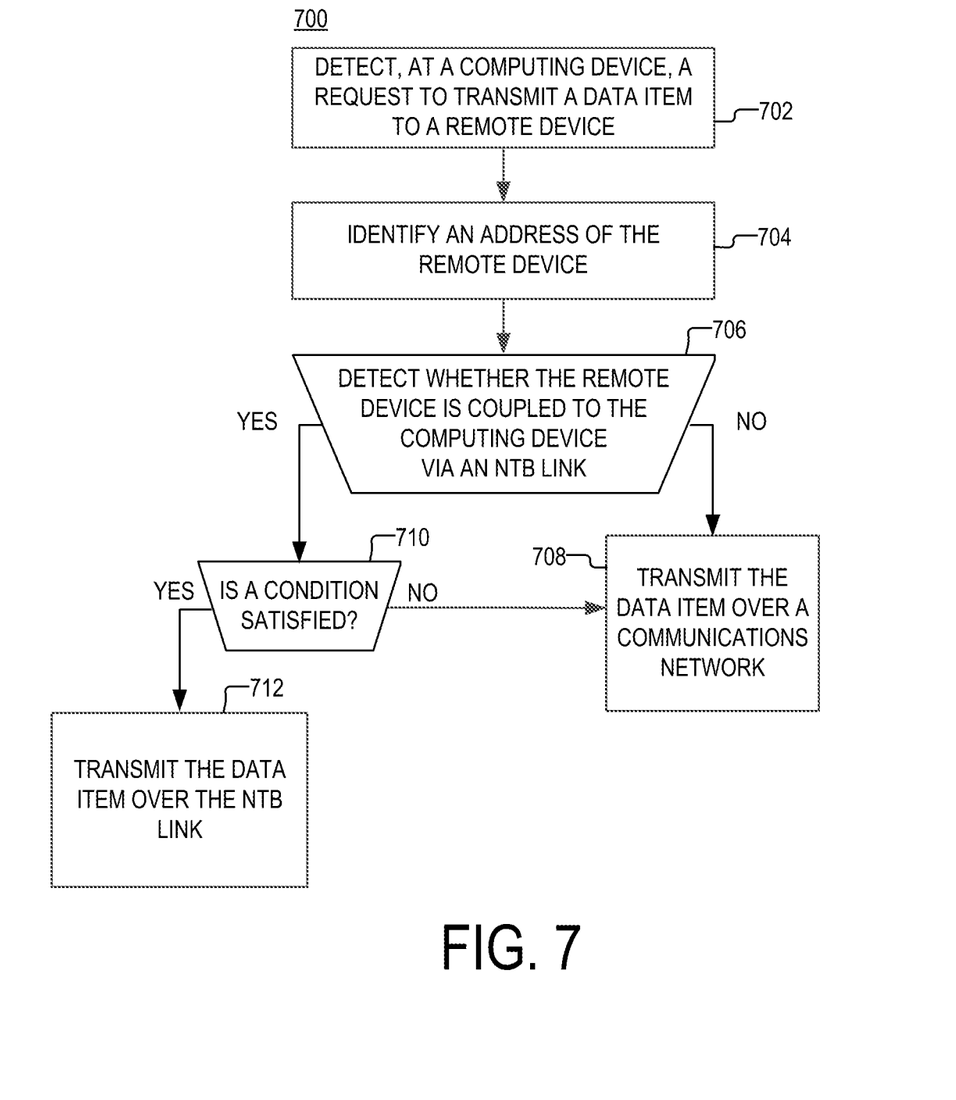
FIG. 7 is a flowchart of an example of a process, according to aspects of the disclosure.

FIG. 7 is a flowchart of an example of a process 700, according to aspects of the disclosure. According to the example of FIG. 7, the process 700 is performed by the computing device 114A. However, the present disclosure is not limited to any specific entity performing the process 700.

At step 702, the computing device detects a request to transmit a data item to a remote device.

At step 704, the computing device identifies a network address of the remote device. According to the present example, identifying the network address of the remote device includes retrieving the network address from the request. However, the present disclosure is not limited to any specific method for identifying the network address.

At step 706, the computing device 114A detects whether the computing device 114A is coupled to the remote device via an NTB link. In some implementations, detecting whether the computing device 114A is coupled to the remote device via an NTB link may include performing a search of the NTB map 212 to detect whether the NTB map includes an entry identifying the remote device and/or whether the NTB map includes an entry mapping the network address of the remote device to an NTB address. If the NTB map 212 includes such an entry, the computing device 114A may determine that it is coupled to the remote device via an NTB link. If the NTB map 212 does not include an entry that maps the network address of the remote device to an NTB address, the computing device may determine that it is not coupled to the remote device via an NTB link.

Additionally or alternatively, in some implementations, detecting whether the computing device 114A is coupled to the remote device via an NTB link may include detecting whether the remote computing device is situated in the same server rack as the computing device 114A. Additionally or alternatively, in some implementations, detecting whether the computing device 114A and the remote computing device are coupled via an NTB link may include performing a search of the peer list 213 to determine if the peer list 213 includes a network identifier (or another identifier of the remote computing device). If the peer list 203 includes the network identifier (or another identifier) of the remote computing device, the computing device 114A may determine that it is coupled to the remote computing device via an NTB link. Otherwise, if the peer list 203 does not include the network identifier (or other identifier of the remote computing device) the computing device 114A may determine that it is not coupled to the remote computing device via an NTB link.

If the computing device 114A is coupled to the remote device via an NTB link the process 700 proceeds to step 710. Otherwise, if the computing device 114A is not coupled to the remote device via an NTB link, the process 700 proceeds to step 710.

At step 708 the computing device 114A transmits the data item to the remote device via the communications network 112.

At step 710, the computing device 114A detects if a predetermined condition is satisfied. Step 710 may be performed in the same manner as step 510, which is discussed above with respect to FIGS. 5-6E. For example, in some implementations, the condition may be satisfied if and only if the size of the data item is below a predetermined threshold. Additionally or alternatively, in some implementations, the condition may be satisfied if and only if the data item does not require cryptographic processing or integrity processing. Additionally or alternatively, in some implementations, the condition may be satisfied if the data item does not require type-2 integrity processing. If the condition is satisfied, the process 700 proceeds to step 712. Otherwise, the process 700 proceeds to step 708.

At step 712, the computing device 114A transmits the data item via the NTB link that connects the computing device 114A to the remote device.

FIGS. 1-7 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing device, the method comprising:
    detecting, by the computing device, a request to transmit data, the data including a plurality of data portions, each of the data portions being associated with a respective remote device that the data portion is destined for;
    identifying, by the computing device, a list of addresses that is associated with the request, each of the addresses in the list corresponding to the respective remote device of a different one of the plurality of data portions;
    detecting, by the computing device, whether the request is local, the detecting being performed by accessing one or more data structures to determine whether each of the recipient addresses in the list identifies a remote device that is coupled to the computing device via a respective direct memory access (DMA) link;
    when the request is not local, transmitting the data over a communications network;
    when the request is local detecting whether a predetermined condition is satisfied by the data;
    when the predetermined condition is satisfied, transmitting each of the data portions in the plurality over the respective DMA link that couples the computing device with the data portion's respective remote device; and
    when the predetermined condition is not satisfied, transmitting each of the plurality of data portions over the communications network.

2. The method of claim 1, wherein each of the plurality of data portions is destined for a same remote device, and the list includes only the address of the remote device.

3. The method of claim 1, wherein detecting whether any given remote device is coupled to the computing device via a DMA link includes detecting whether the given remote device and the computing device are coupled via one of a non-transparent bridging (NTB) link or a link implemented using a data bus in a motherboard that is shared between the computing device and the remote device.

4. The method of claim 1, wherein the data includes a data chunk and each of the plurality of data portions includes a data page.

5. The method of claim 1, wherein the communications network includes a packet-switched network.

6. The method of claim 1, wherein the one or more data structures identify all devices that are coupled to the computing device via a DMA link.

7. The method of claim 1, wherein detecting whether the predetermined condition is satisfied includes detecting whether the data requires cryptographic processing, and the predetermined condition is satisfied only when the data does not require cryptographic processing.

8. The method of claim 1, wherein detecting whether the predetermined condition is satisfied includes detecting whether the data requires integrity processing, and the predetermined condition is satisfied only when the data does not require integrity processing.

9. The method of claim 1, wherein detecting whether the predetermined condition is satisfied includes detecting whether a size of the data is below a threshold, wherein the predetermined condition is satisfied only when the size of the data is below the threshold.

10. The method of claim 1, wherein detecting whether the predetermined condition is satisfied includes detecting whether the plurality of data portions is ordered, wherein the predetermined condition is satisfied only when the plurality of data portions is not ordered.

11. A method for use in a computing device, the method comprising:
    detecting a request to transmit a data item from the computing device to a remote device;
    identifying an address of the remote device;
    detecting, by the computing device, whether the remote device is connected to the computing device via a non-transparent bridging (NTB) link;
    when the remote device is not connected to the computing device via an NTB link, transmitting the data item from the computing device to the remote device via a communications network;
    when the remote device is connected to the computing device via an NTB link, detecting whether the data item satisfies a predetermined condition;
    when the predetermined condition is satisfied, transmitting the data item from the computing device to the remote device via the NTB link; and
    when the predetermined condition is not satisfied, transmitting the data item from the computing device to the remote device via the communications network.

12. The method of claim 11, wherein the detecting includes:
    accessing a data structure that is stored in a memory of the computing device to determine whether the data structure includes the address of the remote device;
    wherein, when the data structure does not include the address of the remote device, the remote device is determined to not be connected to the computing device via an NTB link, and
    wherein, when the data structure includes the address of the remote device, the remote device is determined to be connected to the computing device via an NTB link.

13. The method of claim 11, wherein detecting whether the predetermined condition is satisfied includes detecting whether the data item requires cryptographic processing, and the predetermined condition is satisfied only when the data item does not require cryptographic processing.

14. The method of claim 11, wherein detecting whether the predetermined condition is satisfied includes detecting whether the data item requires integrity processing, and the predetermined condition is satisfied only when the data item does not require integrity processing.

15. The method of claim 11, wherein detecting whether the predetermined condition is satisfied includes detecting whether a size of the data item is below a threshold, wherein the predetermined condition is satisfied only when the size of the data item is below the threshold.

16. A system, comprising:
    a memory; and
    at least one processor that is operatively coupled to the memory, the at least one processor being configured to perform the operations of:
    detecting an I/O request to transmit a data item to a remote device;
    identifying an address of the remote device;
    detecting, based on the address, whether the remote device is connected to the system via a non-transparent bridging (NTB) link;
    when the remote device is not connected to the system via an NTB link, transmitting the data item to the remote device via a communications network;
    when the remote device is connected to the system via an NTB link, detecting whether the data item satisfies a predetermined condition;
    when the predetermined condition is satisfied, transmitting the data item to the remote device via the NTB link; and
    when the predetermined condition is not satisfied, transmitting the data item to the remote device via the communications network.

17. The system of claim 16, wherein the detecting includes:
    accessing a data structure that is stored in the memory to determine whether the data structure includes the address of the remote device;
    wherein, when the data structure does not include the address of the remote device, the remote device is determined to not be connected to the system via an NTB link, and
    wherein, when the data structure includes the address of the remote device, the remote device is determined to be connected to the system via an NTB link.

18. The system of claim 16, wherein detecting whether the predetermined condition is satisfied includes detecting whether the data item requires cryptographic processing, and the predetermined condition is satisfied only when the data item does not require cryptographic processing.

19. The system of claim 16, wherein detecting whether the predetermined condition is satisfied includes detecting whether the data item requires integrity processing, and the predetermined condition is satisfied only when the data item does not require integrity processing.

20. The system of claim 16, wherein detecting whether the predetermined condition is satisfied includes detecting whether a size of the data item is below a threshold, wherein the predetermined condition is satisfied only when the size of the data item is below the threshold.

* * * * *